May 3, 1927.
C. E. WILCOX
PIPE TONGS
Filed April 10, 1922    2 Sheets-Sheet 2
1,627,260
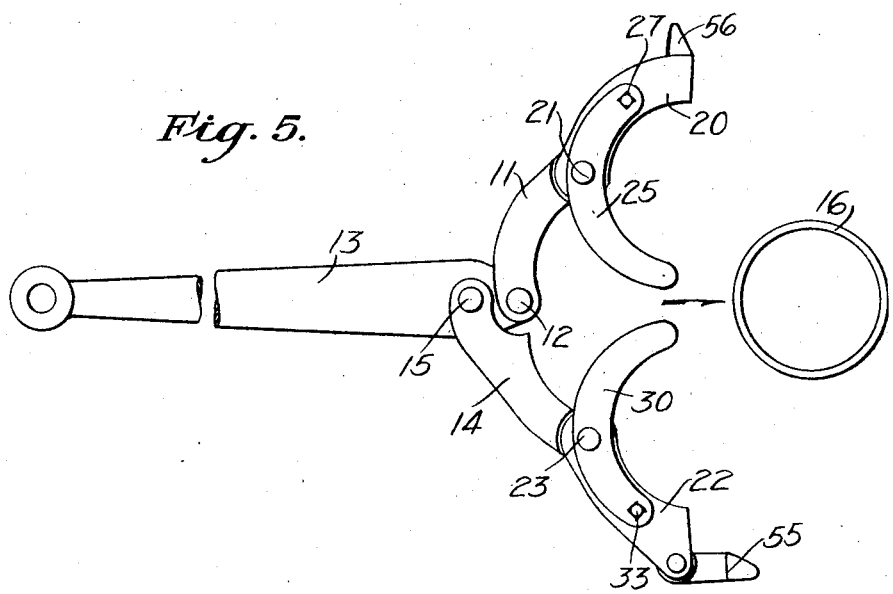
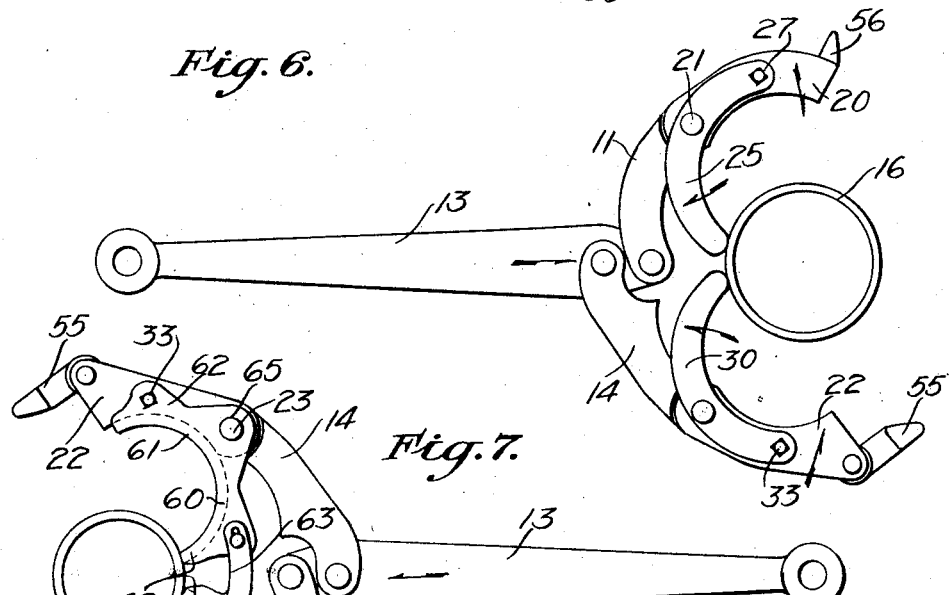
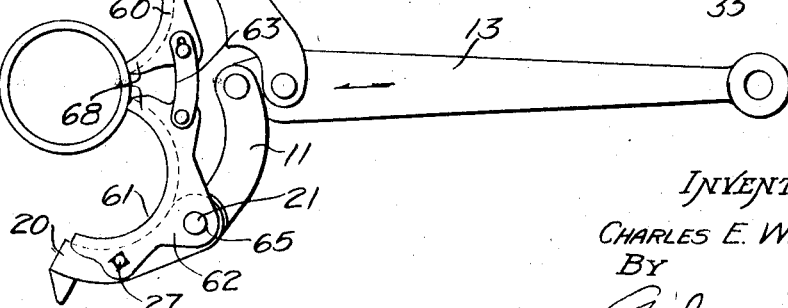
INVENTORS:
CHARLES E. WILCOX,
BY
ATTORNEYS.

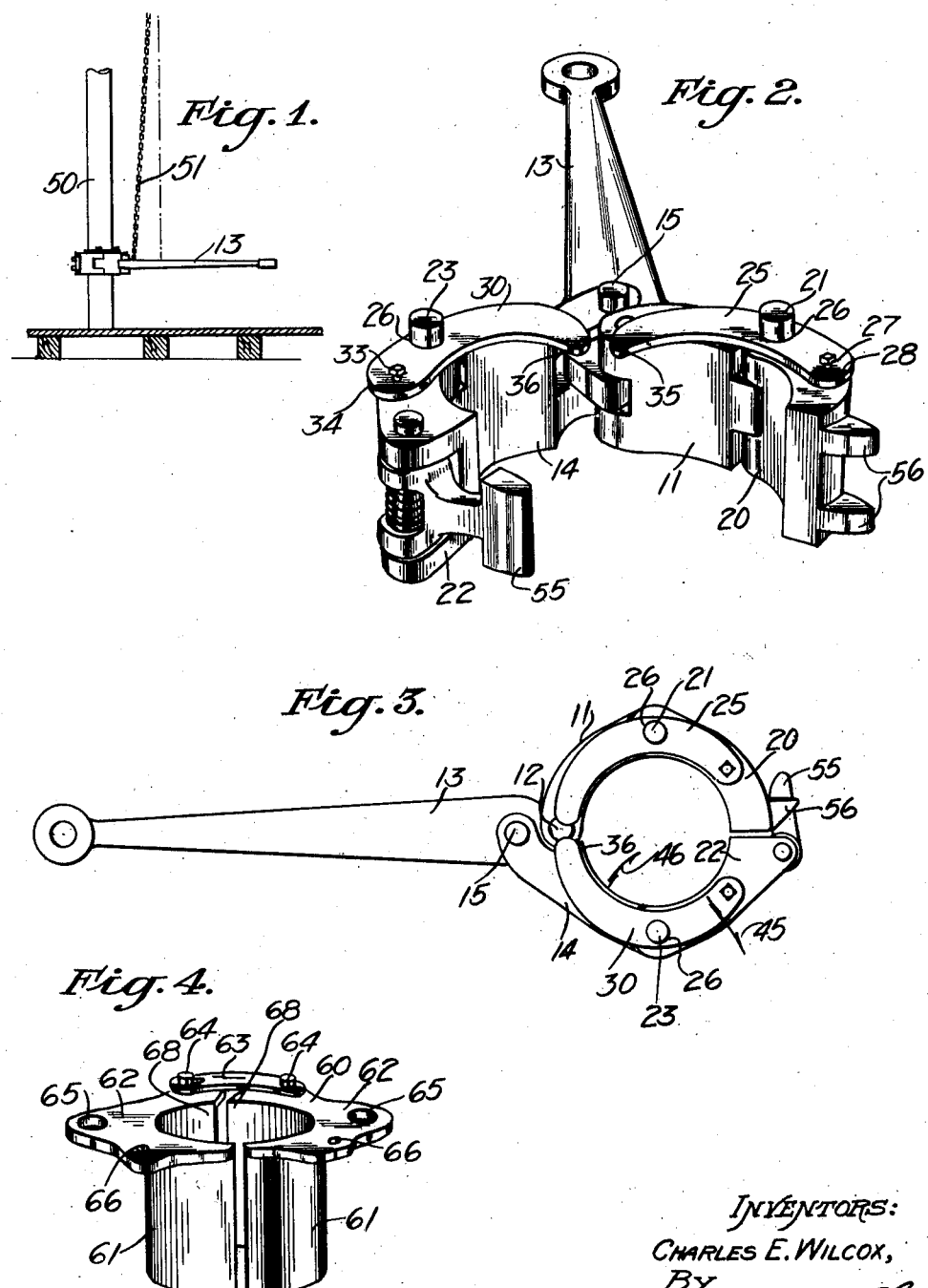

Patented May 3, 1927.

1,627,260

UNITED STATES PATENT OFFICE.

CHARLES E. WILCOX, OF ANAHEIM, CALIFORNIA, ASSIGNOR TO ELIHU C. WILSON.

PIPE TONGS.

Application filed April 10, 1922. Serial No. 551,252.

This invention relates to pipe tongs such as are commonly used in oil well drilling.

It is an object of my invention to provide a pipe tongs which will close automatically when swung against a pipe.

It is an object of my invention to provide in pipe tongs a means whereby the swing of the jaws thereof may be confined to certain predetermined limits.

It is a further object of my invention to provide a pipe tongs in which the jaws thereof will be automatically adjusted to their proper working positions around the object which they are to grip by merely forcing the open jaws thereagainst.

Other objects and advantages will become evident hereinafter.

Referring to the drawing which is for illustrative purposes only:

Fig. 1 is a view illustrating the manner in which my invention is commonly used.

Fig. 2 is a perspective view of pipe tongs embodying my invention.

Fig. 3 is a plan view of the tongs shown in Fig. 1 in closed position.

Fig. 4 is a perspective view of one of the reducing bushings I use to adapt the tongs to different sizes of pipe.

Fig. 5 is a plan view of the tongs in open position preparatory to being swung against a pipe upon which they are to be used.

Fig. 6 is a plan view similar to Fig. 5 showing the jaws of the tongs being closed around the pipe.

Fig. 7 is a view similar to Fig. 6 showing tongs equipped with reducing bushings being closed around a pipe.

In the form of my invention shown in the drawing, a forward toggle link 11 is pivoted at 12 to the end of a lever 13, and an after toggle link 14 is pivoted to the lever 13 at 15. A floating link 20 is hinged to the toggle link 11 upon a pin 21, and a floating link 22 is hinged to the toggle link 14 upon a pin 23. Upon the link 20 I mount an arcuated arm or link 25 having in it a hole 26 to accommodate the head of the pin 21. The arm 25 is secured in place upon the link 20 by being placed over the head of the pin 21 and by having a machine screw 27 passed into the link 20 through the end 28 of the arm 25. An arm or link 30 is mounted upon the link 22 and held thereupon by the head of the pin 23 and a machine screw 33 which passes through the end 34 of the arm 30 into the body of the link 22.

It will be perceived that any movement of either of the floating links will be imparted to the arm mounted thereupon owing to the two point engagement with which the arm is secured to the link. An outward movement of the link 22 as indicated by the arrow 45 in Fig. 3 is accompanied by an inward travel of the end 36 of the arm 30 as indicated by the arrow 46 in the same figure.

In Fig. 1, I show my invention in its most common use, that of holding well casing 50 while joints are being screwed up, and wherein it is customary to swing the tongs upon chains 51, or other suitable means, so that the tongs may be swung into operating position as shown or back out of the way of the workmen without having to lift them each time they are to be moved. When the jaws of the tongs, which jaws are comprised of the links heretofore mentioned, are in the open position shown in Figs. 2 and 5, the inner ends 35 and 36 are in a position considerably in advance of the toggle links 11 and 14. As the tongs are swung forward against the casing 16, the arms 25 and 30 are brought into contact therewith and are thrown forcibly back, pivoting around the pins 21 and 23 as shown in Fig. 6, and thereby carrying the links into the closed position shown in Fig. 3. A latch pawl 55 upon the link 22 engages with lugs 56 upon the link 20 and the jaws are thus securely locked in operative position.

The reducing bushing 60, shown in Fig. 4 in perspective and in Fig. 7 in use upon the tongs, is composed of semicylindrical shoes 61 adapted to nearly surround the pipe on which its use is intended, and which shoes are provided with flanges 62. The shoes 61 are linked together by a slotted link 63 which extends between pins 64 mounted upon the flanges 62 thereof. The arms 25 and 30 are removed from the tongs when it is desired to use the bushing 60 as the bushing is so constructed that it will perform the same functions as the arms 25 and 30. The flanges 62 are provided with holes 65 through which the pins 21 and 23 extend when the bushing is in place upon the jaws of the tongs, and the screws 27 and 33 pass through holes 66 in the flanges 62 securing the bushing members to the floating links 20 and 22 so as to be turnable therewith upon the pins 21 and 23. The rearward portions 68 of the bushing shoes swing forward as the jaws of the tongs are opened in the same manner and for the same purpose as the actuating arms 35 and 36. Links 63 of Figs. 4 and 7, acts to limit the opening movements of the jaw links as will be obvious from an inspection of Fig. 7.

I claim as my invention:

1. A pipe tongs comprising: a series of members adapted to enclose and grip a pipe; means for securing the free ends of said members together about a pipe; means for constricting said members about a pipe; and arms removably attached to said members, there being projections on said arms engaged by said pipe to close said members about said pipe.

2. In a pipe tongs having a plurality of members adapted to encircle and engage a pipe, the combination of arms removably attached to some of said members, there being projections on said arms so placed as to be automatically actuated by the pipe to close the members about said pipe.

3. A pipe tongs comprising two toggle links; a toggle lever having one pin to which one of said toggle links is pivoted and a second pin to which the other of said toggle links is pivoted; a floating link pivoted on the free end of one of said toggle links; a floating link pivoted on the free end of the other of said toggle links; means for locking the free ends of said floating links together; one member secured to one of said floating links and projecting, when the tongs are open, into the space occupied by the pipe when the tongs are closed, and a second member similarly secured to the other of said floating links and similarly projecting.

4. A pipe tongs comprising two toggle links; a floating link pivoted on the free end of one of said toggle links; a floating link pivoted on the free end of the other of said toggle links; means for locking the free ends of said floating links together; a lever arranged to compress the encircling band, formed of said four links, against the pipe; one member secured to one of said floating links and projecting, when the tongs are open, into the space occupied by the pipe when the tongs are closed; and a second member similarly secured to the other of said floating links and similarly projecting.

5. In a pipe tongs, the combination of a fulcrum lever, a plurality of links one of which is hinged to the lever and another of which is hinged to the first mentioned link to form a band to encircle a pipe, means to hold the links in their pipe encircling position, said band being so constructed that it can be opened to allow it to be placed about a pipe, and a member removably attached to the last mentioned link and so placed as to be struck by a pipe as it is swung inside said links and thus throw said links about said pipe.

6. In a well casing tongs, the combination with the operating handle, of a plurality of work engaging jaws adapted to encircle and grip the work, connections between two of the jaws and handle, said jaws being adapted to be opened and closed for the work to be placed in and removed from the tool, the center of gravity of the tongs remaining substantially stationary during the opening and closing of said jaws, oppositely disposed means engageable with the work as the latter is moved into the jaws for closing the jaws around the work, and means for releasably locking the jaws in closed position.

7. In a well casing tongs, the combination with an operating handle, of a plurality of circularly arranged gripping jaws, pivotal connections between the handle and two of said jaws, releasable locking means connecting the jaws at a point remote from the handle, the jaws intermediate the handle and said locking means being pivotally connected whereby the releasably locked jaws may be opened for placing the work within the jaws, and means carried by the said jaws for automatically moving each of said jaws toward the other around the work, as the latter is inserted between them, the center of gravity of the tongs remaining substantially stationary during the opening and closing of the jaws.

8. In a well casing tongs, the combination of an operating handle, inner opposed gripping jaws operatively connected to the handle, outer opposed gripping jaws pivotally connected to the inner jaws, said outer jaws being movable on their pivotal centers to open and close the tongs whereby the work may be inserted in and removed from the tongs, means movable into the bore of the tongs by an opening movement of both the outer jaws and adapted to be engaged by the work to close said jaws upon insertion of the work in the tongs, and means for releasably locking the jaws in closed position.

9. In a well casing tongs, the combination of an operating handle, inner opposed gripping jaws operatively connected to said handle, outer opposed gripping jaws pivotally mounted at their inner ends on the inner jaws, whereby said outer jaws may be opened and closed to permit the work to be inserted in and removed from the tongs, projections formed on the outer jaws, said projections extending inwardly beyond the pivotal centers of said outer jaws whereby they will be moved into the bore of the tongs by opening the outer jaws, and means for releasably locking the outer jaws in their closed position.

10. A pipe tongs comprising a handle and two series of pivotally interconnected segments adapted together to encircle a pipe, one segment of each series being pivoted to the handle and the other segments of each series being pivoted to and pivotally supported on the handle pivoted segment of that series, and a projecting member connected to one of the last mentioned segments of each series, projecting into the segment enclosed space when the tongs are open, and adapted to be engaged and moved by the pipe to close that segment and with it another pivotally connected segment, onto the pipe.

11. A pipe tongs comprising a handle and two series of pivotally interconnected segments adapted together to encircle a pipe, one segment of each series being pivoted to the handle and the other segments of each series being pivoted to and pivotally supported on the handle pivoted segment of that series, and a projecting member connected to one of the last mentioned segments of each series, projecting into the segment enclosed space when the tongs are open, and adapted to be engaged and moved by the pipe to close that segment and with it another pivotally connected segment, onto the pipe; the two series of segments being arranged in substantially symmetrical relation with respect to the handle, and their projecting ends being near each other.

12. In a well casing tongs, the combination of an operating handle, a pair of inner opposed gripping jaws pivotally mounted on the handle, a pair of outer opposed gripping jaws pivoted on the inner jaws and adapted to be opened and closed to permit work to be inserted in and removed from the tongs, means for automatically closing the outer jaws upon insertion of the work in the tongs, said closing means being movable into the bore of the tongs by an opening movement of the outer jaws, means for limiting the opening movement of said outer jaws, and means for releasably locking the outer jaws in closed position.

13. In a well casing tongs, the combination of an operating handle, a pair of inner opposed gripping jaws pivotally mounted on the handle, a pair of outer opposed gripping jaws pivoted on the inner jaws and adapted to be opened and closed to permit work to be inserted in and removed from the tongs, means for automatically closing the outer jaws upon insertion of the work in the tongs, said closing means being mounted on the outer jaws and being movable into the bore of the tongs by an opening movement of the outer jaws, and means for releasably locking the outer jaws in closed position, said movement limiting means for the outer jaws comprising a connecting link connected to and extending between the closing means.

14. A pipe tongs comprising a handle and two series of pivotally inter-connected segments adapted together to encircle a pipe, one segment of each series being pivoted to the handle and the other segments of each series being pivoted to and pivotally supported on the handle pivoted segment of that series, and a projecting member connected to one of the last mentioned segments of each series, projecting into the segment enclosed space when the tongs are open, and adapted to be engaged and moved by the pipe to close that segment and with it another pivotally connected segment, onto the pipe; and motion limiting connection between the projecting ends of said members.

15. In a pipe tongs, the combination of a handle, a jaw connected with the handle, another jaw pivoted to the first mentioned jaw, and adapted to be swung open to enable the jaws to be placed around a pipe, means to hold the jaws closed, and a reducing bushing rigidly carried by the last mentioned jaw and swinging therewith, adapted to rest against the face of the first mentioned jaw when the jaws are closed to reduce the effectual diameter of the tongs, and adapted when the second mentioned jaw is swung open to project into the space within the jaws.

16. In a pipe tongs, the combination of a fulcrum lever, a plurality of links one of which is hinged to the lever and another of which is hinged to the first mentioned link to form a band to encircle a pipe, means to hold the links in their pipe encircling position, said band being so constructed that it can be opened to allow it to be placed about a pipe, and a member removably attached to the last mentioned link and so placed as to be struck by a pipe as it is swung inside said links and thus throw said links about said pipe, said member including a bushing that rests against the first mentioned link when the tongs are closed to reduce the effectual working size of the tongs.

17. A pipe tongs comprising a handle and two series of pivotally inter-connected segments adapted together to encircle a pipe, one segment of each series being pivoted to the handle and the other segments of each series being pivoted to and pivotally supported on the handle pivoted segment of that series, and a projecting member connected to one of the last mentioned segments of each series, projecting into the segment enclosed space when the tongs are open, and adapted to be engaged and moved by the pipe to close that segment and with it another pivotally connected segment, onto the pipe, said last mentioned means including a bushing adapted to rest against one of the first mentioned links when the tongs are closed to reduce the effectual working size of the tongs.

18. In a well casing tongs, the combination of an operating handle, inner opposed gripping jaws operatively connected to the handle, outer opposed gripping jaws pivotally connected to the inner jaws, said outer jaws being movable on their pivotal centers to open and close the tongs whereby the work may be inserted in and removed from the tongs, two members mounted each on one of the outer jaws and adapted to be engaged by the work to close said jaws upon insertion of the work in the tongs, said members each including a reducing bushing adapted to rest against the corresponding inner jaw when the tongs are closed and to reduce the effectual working size of the tongs, and means for releasably locking the jaws in closed position.

19. In a pipe tongs, the combination of a handle, a jaw connected with the handle, another jaw pivoted to the first mentioned jaw and adapted to be swung open to enable the jaws to be placed around a pipe, means to hold the jaws closed about a pipe, and a combined bushing and closing member removably mounted on and swinging with the last mentioned jaw, said member having a bushing part that lies inside a jaw and having a part adapted to project into the space within the jaws when the second mentioned jaw is swung open and adapted to be struck by the pipe when the jaws are placed thereupon.

20. Improvements in tongs, comprising a pair of jaws each jaw comprising a plurality of hinged sections and cam means hinged at the hinged zone of such sections and adapted to engage certain of the sections about the work.

21. Improvements in tongs, comprising a pair of jaws each jaw comprising a plurality of hinged sections, and cam means hinged at the hinged zone of such sections and adapted to engage work upon entrance of such work between the jaws to cam certain of the sections about the work; in combination with means for automatically latching the jaws about the work when all of the sections of said jaws are in close engagement with the work.

22. In a pipe tongs, the combination of a handle, a jaw connected with the handle, another jaw pivoted to the first mentioned jaw and adapted to be swung open to enable the jaw to be placed along the pipe, means to hold the jaws in pipe encircling position, and a member removably mounted upon the pivot of the second mentioned jaw and attached to said second mentioned jaw and so placed as to be struck by a pipe when said second mentioned jaw is in open position.

In testimony whereof, I have hereunto set my hand at Los Angeles, California, this 3rd day of April 1922.

CHARLES E. WILCOX.